United States Patent [19]

Kiefer et al.

[11] 4,250,486
[45] Feb. 10, 1981

[54] VEHICLE MOTION ALARM

[75] Inventors: Edward H. Kiefer, 2400 Maplewood Dr.; George P. Lysenko, 1870 Hansel Dr.; Richard L. Cade, 190 S. Grandview, all of Dubuque, Iowa 52001

[73] Assignee: Deere & Company, Moline, Ill.

[21] Appl. No.: 21,371

[22] Filed: Mar. 19, 1979

[51] Int. Cl.³ .................. B60Q 5/00; G08B 19/00
[52] U.S. Cl. ........................ 340/52 R; 200/61.91; 307/10 R; 340/55; 340/70; 340/522
[58] Field of Search ............ 340/52 R, 55, 66, 67, 340/70, 73, 500, 522, 540, 672; 200/61.88, 61.91; 307/10 R

[56] References Cited

U.S. PATENT DOCUMENTS

| 2,580,677 | 1/1952 | Hadley | 340/52 R X |
|---|---|---|---|
| 2,920,156 | 1/1960 | Rice et al. | 340/70 X |
| 3,439,324 | 4/1969 | Kirimoto et al. | 340/52 R X |
| 3,569,927 | 3/1971 | Guyton et al. | 340/70 X |
| 3,827,024 | 7/1974 | Anderson et al. | 340/70 |
| 4,128,827 | 12/1978 | Coleman et al. | 340/52 R |

Primary Examiner—John W. Caldwell, Sr.
Assistant Examiner—Joseph E. Nowicki

[57] ABSTRACT

An industrial vehicle is provided with a motion alarm actuated such as to never sound when the vehicle is stationary, to always sound when the vehicle moves rearwardly and to sound during forward vehicle motion except when the vehicle engine is running and the shift lever is placed in a position intended for forward vehicle motion.

11 Claims, 6 Drawing Figures

VEHICLE MOTION ALARM

BACKGROUND OF THE INVENTION

The present invention relates to a vehicle motion alarm for use with industrial vehicles.

It has long been recognized that on job sites where numerous industrial vehicles are operating, a hazardous condition is present due to the inability of workers to always sense the proximity of the vehicles and the inability of vehicle operators to see objects located in a zone close behind the vehicles.

In an attempt to somewhat alleviate the safety hazard involved, various laws have been passed by various governmental bodies which require industrial vehicles, when operated under certain conditions, to be provided with motion alarms which sound whenever the vehicles are operated in reverse.

Heretofore, it has been the practice to have this required alarm function performed either by a mechanically operated alarm designed to sound only when the vehicle moves in reverse or by electrically or electronically operated alarms which are designed to sound only when the transmission shift selector is placed in reverse or when the transmission drive shaft rotates in reverse. These known alarms all suffer the disadvantage of not sounding during accidental vehicle motion as when an unattended vehicle coasts down a hill. The mechanical alarms suffer the further disadvantage of being adversely affected by dust, mud, water and snow or the like as might be present at the working site and apt to find their way into the alarm mechanism.

SUMMARY OF THE INVENTION

According to the present invention, there is provided a novel vehicle motion alarm system.

An object of the invention is to provide a vehicle motion alarm system including an alarm which is caused to sound not only when the vehicle is moving in reverse but also when the vehicle transmission is in neutral and the vehicle coasts forwardly or when the vehicle engine is stopped and the vehicle coasts forwardly.

These and other objects will become apparent from a reading of the ensuing description together with the appended drawings.

DESCRIPTION OF THE PREFERRED EMBODIMENT

Figure 1:
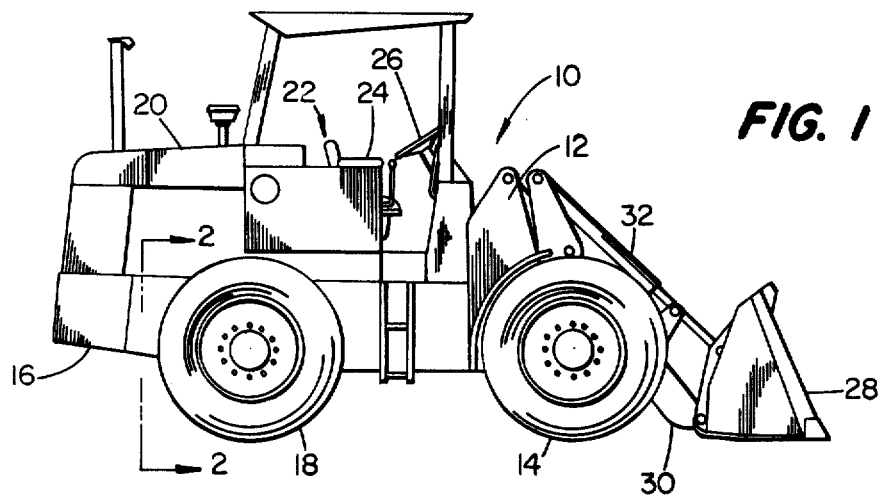
FIG. 1 is a right side elevational view of an industrial vehicle representing one type of vehicle with which the present invention is intended to be used.

Referring now to FIG. 1, therein is shown an industrial vehicle in the form of an articulated loader 10 including a front section 12 supported on a set of front wheels 14 and a rear section 16 supported on a set of rear wheels 18, the sections 12 and 18 being interconnected by a vertical pivot assembly (not shown). The rear section 16 supports an engine (not shown) within a compartment 20 and supports an operator station 22 forwardly of the compartment 20. An operator's seat 24 is located in the station 22 rearwardly of a steering assembly 26.

A loader bucket 28 is mounted on the forward section 12 by means of a lift arm assembly 30 and a powered bucket tilt linkage 32.

An operator seated in the seat 24 has fairly good forward visibility especially when the bucket 28 is elevated but has hampered rearward visibility due to the area occupied by the engine compartment 20. Thus, it is with vehicles such as the loader 10 that the present invention is particularly adapted for use.

Figure 4:
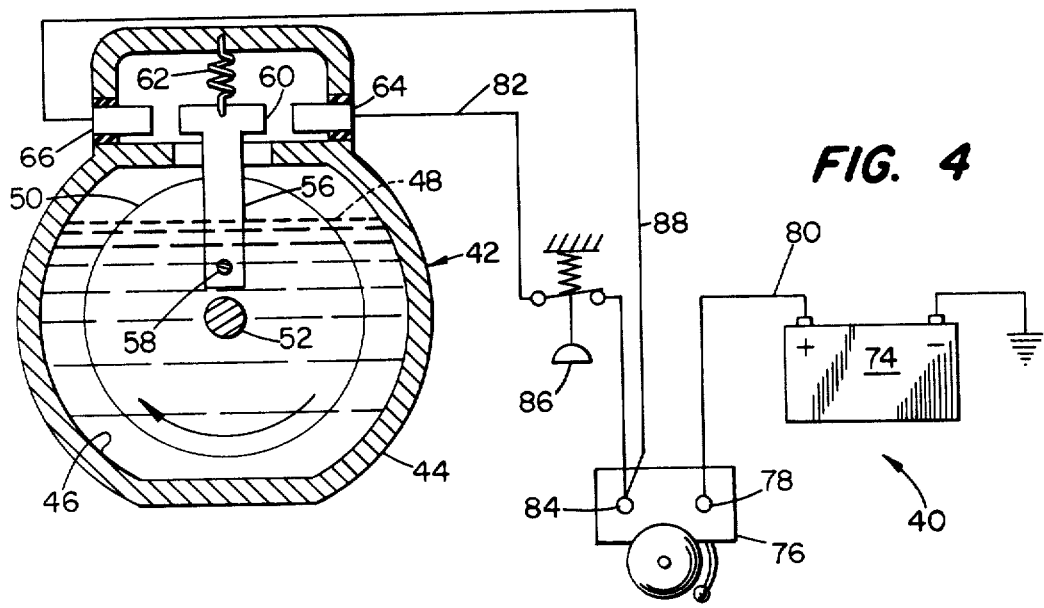
FIG. 4 is a schematic of a vehicle motion alarm system of the present invention as constructed for use with a vehicle having a powershift transmission.
Figure 5:
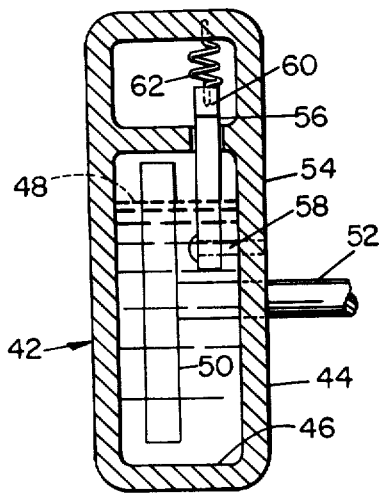
FIG. 5 is a vertical sectional view taken along line 5—5 through the vehicle motion sensing device of the alarm system illustrated in FIG. 6.

Referring now to FIG. 4, therein is shown a vehicle motion alarm system 40 adapted for use with vehicles having powershift transmissions. Specifically, the alarm system 40 includes a vehicle motion sensing mechanism 42 including a sealed housing 44 defining a chamber 46 containing a fluid 48 such as oil. Located in the chamber 46 is a cylindrical plate 50 fixed to a shaft 52 which extends through a wall 54 of the chamber. A T-shaped rotation sensing arm 56 is located in the chamber 46 and has its lower end pivotally mounted on a pin 58 fixed to the wall 54 at a location above the shaft 52. The arm 56 has a head 60 located above the level of the fluid 48 and a spring 62 is coupled between the housing 44 and the head 60 to normally hold the head centered between forward and reverse drive contacts 64 and 66 mounted in the housing 44 in the path of movement that the head 60 traces when the arm 56 swings about the pin 58. As will be apparent from the description below, the arm 56, in effect, serves as the pole element of a single pole, double throw switch.

Figure 2:
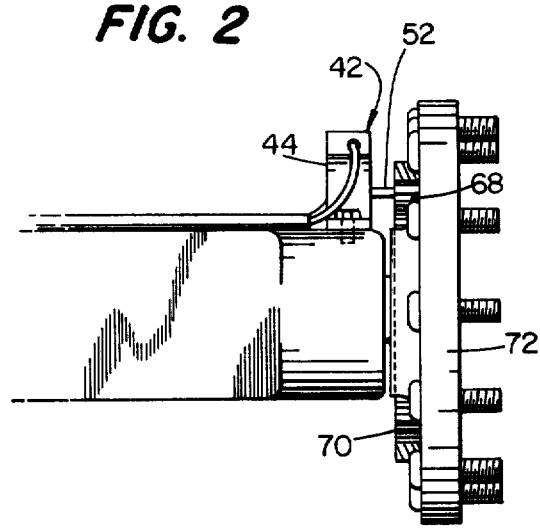
FIG. 2 is an enlarged view taken along line 2—2 of FIG. 1 and showing the connection of a portion of the motion alarm system of the present invention with the vehicle hub.
Figure 3:
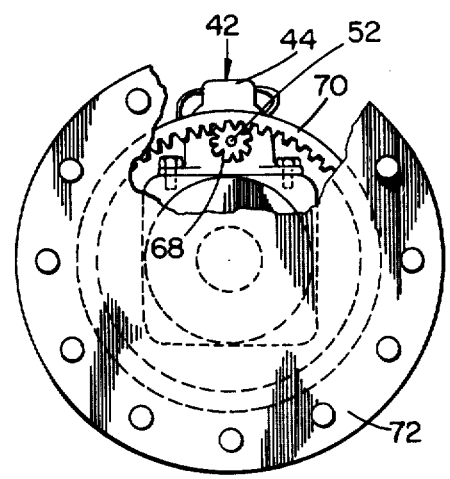
FIG. 3 is a left side elevational view of FIG. 2 with portions broken away.

As can best be seen in FIGS. 2 and 3, the shaft 52 has a gear 68 fixed thereon and meshed with an internal ring gear 70 fixed for rotation with a hub 72 of one of the wheels of the rear set of wheels 18.

Returning now to FIG. 4, it can be seen that when the shaft 52 is rotated clockwise in the direction of the arrow, the plate 50 will rotate through the fluid 48 and cause the latter to act upon the arm 56 to cause the arm to rotate clockwise on the pin 58 to bring the head 60 into engagement with the forward drive contact 64. A ground connection is thus effected by the arm 56. Similarly, counterclockwise rotation of the shaft 52 as effected by reverse rotation of the wheel 18 will cause the plate 50 to rotate through the fluid 48, which then acts to rotate the arm 56 counterclockwise on the pin 58 and bring the head 60 into engagement with the reverse drive contact 66. The arm 56 then acts again to effect a ground connection.

Specifically, a battery 74 is provided for powering an alarm here shown in the form of a bell 76 and is connected to a first contact 78 of the bell via a power lead 80. A forward drive lead 82 is coupled between a second contact 84 of the bell 76 and the forward drive contact 64, the lead 82 containing a normally closed pressure switch 86. The switch 86 would be coupled in any conventional manner to be actuated to its open position by fluid pressure routed for actuating forward drive effecting power shift elements of the transmission. Thus, the bell 76 is energized anytime the vehicle transmission is in neutral and the vehicle rolls forwardly.

Connected in parallel with the lead 82 is a reverse drive lead 88 connected between the bell contact 84 and the reverse drive contact 66. Thus the bell 76 is also energized anytime the vehicle moves in reverse.

Figure 6:
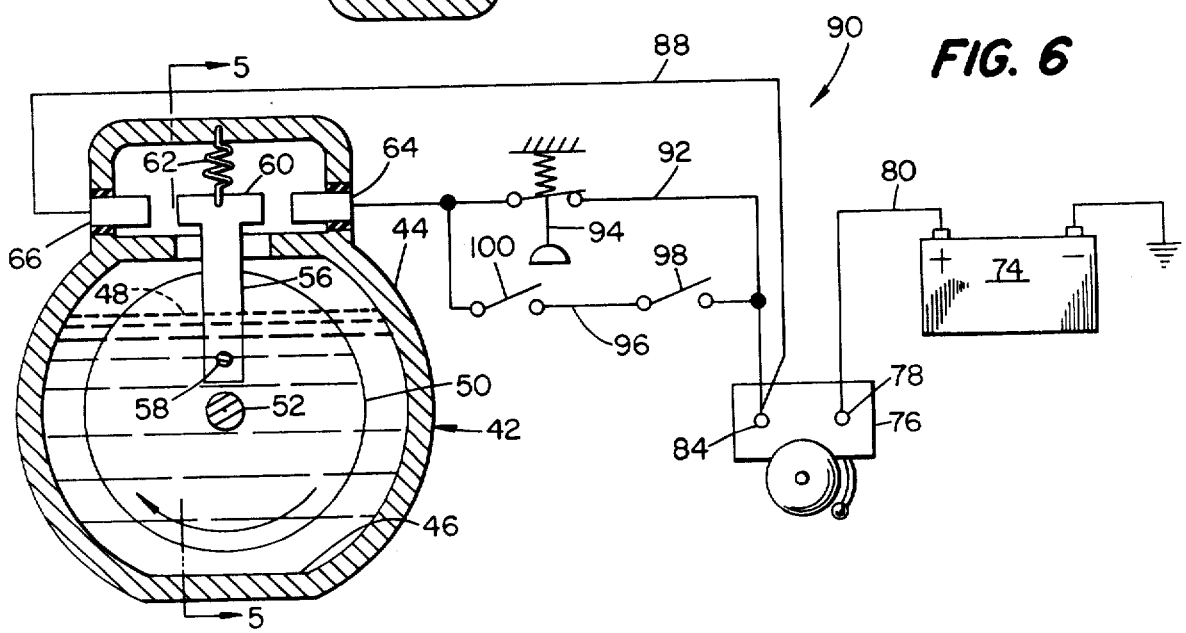
FIG. 6 is a schematic of a vehicle motion alarm system of the present invention as constructed for use with a vehicle having a manual transmission.

Referring now to FIG. 6, there is shown a vehicle motion alarm system 90 adapted for use with vehicles having manual transmissions and including many elements which are identical to those used in the system 40 and for the sake of simplicity are here identified by the same reference numerals. The area of difference of the system 90 over the system 40 resides in the sensing of vehicle forward drive operating conditions and includes a forward drive lead 92 connected between the bell contact 84 and the forward drive contact 64, the lead 92 containing a normally closed, pressure switch 94 adapted for connection in any conventional manner to the engine lubrication oil system of the vehicle 10 so as to open whenever the engine is operating. A bypass lead 96 is connected to the lead 92 in bypassing relationship to the switch 94 and contains a normally closed switch 98, adapted to be coupled to the main drive clutch linkage such as to be opened anytime the clutch is disengaged, connected in series with a normally closed switch 100 adapted to be coupled to the transmission shift linkage such as to be opened anytime the shift linkage is shifted to effect a forward driving condition in the transmission.

The operation of the invention is as follows: Assuming the vehicle 10 to have a powershift transmission and equipped with the alarm system 40 illustrated in FIG. 4, the normally closed pressure switch 86 will be coupled in fluid communication with a fluid pressure activated transmission element for effecting a forward driving condition in the transmission when actuated. When the vehicle 10 is at rest, with its engine off, the pressure switch 86 will be closed, however, the forward and reverse motion actuated switches 64 and 66 will be open and consequently no current will pass through the bell 76 to actuate the same. However, if the vehicle should somehow begin rolling either forwardly or reversely, one or the other of the switches 64 and 66 will be closed to thus complete the circuit to cause the bell to ring.

When the vehicle 10 is being purposely driven in reverse, the switch 66 will, of course, be closed to complete a circuit through the bell 76 causing the latter to ring. However, when the vehicle is being purposely driven forwardly, the pressure switch 86 will be open and no current will flow through the bell 76 to actuate the same.

Should the vehicle 10 have a manually shifted transmission, the vehicle will be equipped with the alarm system 90 with normally closed pressure switch 94 coupled to the engine lubrication oil pressure system such as to be opened only when the engine is running, with the normally closed clutch linkage operated switch 98 coupled to the main traction drive control clutch linkage such as to be opened only when the clutch is disengaged and with the normally closed shift control linkage operated switch 100 coupled to the transmission shift linkage such as to be opened only when the shift linkage is moved to effect a forward driving condition in the transmission.

The operation of the vehicle 10 so equipped with the alarm system 90 when the vehicle moves in reverse, either under power or otherwise, is exactly the same as that of the aforedescribed system 40. With respect to forward motion of the vehicle 10, the switches 64 and 94 are closed to complete a circuit through the bell anytime the engine is not running and the vehicle moves forwardly. When the engine is running, the switch 94 is open and a circuit will be completed through the bell 76 only when the transmission clutch is engaged, the transmission is in neutral, and the vehicle is moving forward.

We claim:

1. A vehicle motion alarm system, comprising: an electrically energizable alarm; a source of electric current; an electrical circuit connecting the alarm for being energized by the source in accordance with preselected conditions of vehicle operation; said circuit including a first circuit loop containing a reverse motion switch means operable for completing a circuit through the alarm in response to reverse motion of the vehicle; and said circuit including a second circuit loop containing a forward motion sensing switch means connected in series with engine and transmission condition sensing switch means with the forward motion sensing means and the engine and transmission condition sensing switch means acting to complete a circuit through the alarm only upon the engine being stopped while the vehicle moves forwardly or upon the transmission being in neutral while the vehicle moves forwardly; said forward and reverse responsive switch means including spaced forward and reverse switch contacts; an intermediate switch member located in a normal centered position between the contacts and mounted for movement in opposite directions to first and second positions respectively in engagement with the forward and reverse switch contacts to thereby complete a circuit through the forward and reverse switch means; a drive element adapted for connection to a vehicle drive for movement in forward and reverse directions respectively in response to forward and reverse movement of the vehicle; and connection means between the drive element and the intermediate switch member for causing the latter to be moved to its first and second positions respectively in response to forward and reverse movement of the drive member.

2. A vehicle motion alarm system, comprising: an electrically energizable alarm; a source of electric current; an electrical circuit connecting the alarm for being energized by the source in accordance with preselected conditions of vehicle operation; said circuit including a first circuit loop containing a reverse motion sensing switch means operable for completing a circuit through the alarm in response to reverse motion of the vehicle; and said circuit including a second circuit loop containing a forward motion sensing switch means responsive to forward motion of the vehicle and a transmission condition sensing switch means responsive to one of the conditions of the transmission being in neutral or lacking pressure for shifting forward drive effecting elements thereof connected in series with each other and operable to complete circuit through the alarm only upon the vehicle moving forwardly while the transmission is in one of the conditions of being in neutral or lacking pressure for shifting forward drive effecting elements thereof; said forward and reverse responsive switch means including spaced forward and reverse switch contacts; an intermediate switch member located in a normal centered position between the contacts and mounted for movement in opposite directions to first and second positions respectively in engagement with the forward and reverse switch contacts to thereby complete a circuit through the forward and reverse switch means; a drive element adapted for connection to a vehicle drive for movement in forward and reverse directions respectively in response to forward and reverse movement of the vehicle; and connection means between the drive element and the intermediate switch member for causing the latter to be moved to its first and second positions respectively in response to forward and reverse movement of the drive member.

3. A vehicle motion alarm system, comprising: an electrically energizable alarm; a source of electrical current; an electrical circuit connecting the alarm for being energizable by the source in accordance with preselected conditions of vehicle operation; said circuit including a first circuit loop containing a reverse motion sensing switch means operable for completing a circuit through the alarm in response to reverse motion of the vehicle; said circuit including a second circuit loop containing a forward motion sensing switch means connected in series with an engine condition responsive switch means and operable in conjunction therewith to complete a circuit through the alarm only upon the engine being stopped while the vehicle moves forwardly; said forward and reverse responsive switch means including spaced forward and reverse switch contacts; an intermediate switch member located in a normal centered position between the contacts and mounted for movement in opposite directions to first and second positions respectively in engagement with the forward and reverse switch contacts to thereby complete a circuit through the forward and reverse switch means; a drive element adapted for connection to a vehicle drive for movement in forward and reverse directions respectively in response to forward and reverse movement of the vehicle; and connection means between the drive element and the intermediate switch member for causing the latter to be moved to its first and second positions respectively in response to forward and reverse movement of the drive member.

4. The alarm system defined in claim 3 wherein said second circuit loop includes a bypass lead bypassing said engine condition responsive switch means and having opposite ends connected in direct electrical communication with the forward motion sensing means and with the alarm, respectively; and said bypass lead containing a main transmission clutch condition responsive switch means connected in series with a shift lever position responsive switch means and operable in conjunction therewith to complete a circuit through the alarm only upon the lever being in neutral and the clutch being engaged while the vehicle moves forwardly.

5. The vehicle motion alarm system defined in claim 1, wherein said forward and reverse motion sensing switch means further includes a housing defining a fluid chamber; said drive member located in the chamber; said intermediate switch element being located adjacent to the drive member; and said connection means between the drive element and intermediate switch element being fluid located in the chamber.

6. The vehicle motion alarm system defined in claim 2, wherein said forward and reverse motion sensing switch means further includes a housing defining a fluid chamber; said drive member located in the chamber; said intermediate switch element being located adjacent to the drive member; and said connection means between the drive element and intermediate switch element being fluid located in the chamber.

7. The vehicle motion alarm system defined in claim 3, wherein said forward and reverse motion sensing switch means further includes a housing defining a fluid chamber; said drive member located in the chamber; said intermediate switch element being located adjacent to the drive member; and said connection means between the drive element and intermediate switch element being fluid located in the chamber.

8. The vehicle motion alarm system defined in claim 5, wherein said drive member is fixed to a shaft rotatably mounted in the housing; said switch element being T-shaped and having its stem pivotally supported from the housing at a location adjacent the drive member; and a biasing spring connected to the head of the T-shaped switch element and normally maintaining the latter in its centered position.

9. The vehicle motion alarm system defined in claim 6, wherein said drive member is fixed to a shaft rotatably mounted in the housing; said switch element being T-shaped and having its stem pivotally supported from the housing at a location adjacent the drive member; and a biasing spring connected to the head of the T-shaped switch element and normally maintaining the latter in its centered position.

10. The vehicle motion alarm system defined in claim 7, wherein said drive member is fixed to a shaft rotatably mounted in the housing; said switch element being T-shaped and having its stem pivotally supported from the housing at a location adjacent the drive member; and a biasing spring connected to the head of the T-shaped switch element and normally maintaining the latter in its centered position.

11. A vehicle motion alarm system, comprising: an alarm; a source of electrical current connected to the alarm; a first circuit loop connected between the alarm and ground and including a normally open rearward motion switch means operable for closing in response to reverse motion of the vehicle to thereby connect the alarm to ground; a second circuit loop connecting the alarm to ground and including a normally closed pressure switch adapted for connection to engine lubricating oil pressure such as to be opened when the vehicle engine is running; a bypass lead connected to the second circuit loop in shunting relationship to the pressure switch and including a normally closed clutch operated switch adapted for operation by the vehicle traction-drive clutch operating linkage such as to be opened in response to the disengagement of the vehicle traction drive clutch, and a normally closed shift lever operated switch adapted for operation by the shift lever linkage such as to be opened in response to the shift lever being positioned so as to effect a forward driving condition in the vehicle transmission; and a normally open forward motion switch means connected in the second loop in series with the pressure switch and operable for closing in response to forward motion of the vehicle whereby a circuit will be completed through the bypass lead to effect operation of the alarm when the traction drive clutch is engaged, the transmission is in neutral and the vehicle is moving forward.

* * * * *